US012671456B2

(12) United States Patent
Li et al.

(10) Patent No.: US 12,671,456 B2
(45) Date of Patent: Jun. 30, 2026

(54) SIGNAL PROCESSING CIRCUIT, CHIP, CIRCUIT BOARD ASSEMBLY AND RADIO-FREQUENCY TRANSCEIVER

(71) Applicant: SANECHIPS TECHNOLOGY CO., LTD., Shenzhen (CN)

(72) Inventors: Jijun Li, Shenzhen (CN); Xiren Guo, Shenzhen (CN)

(73) Assignee: SANECHIPS TECHNOLOGY CO., LTD., Shenzhen (CN)

( * ) Notice: Subject to any disclaimer, the term of this patent is extended or adjusted under 35 U.S.C. 154(b) by 249 days.

(21) Appl. No.: 18/722,993

(22) PCT Filed: Feb. 28, 2022

(86) PCT No.: PCT/CN2022/078506

§ 371 (c)(1),
(2) Date: Jun. 21, 2024

(87) PCT Pub. No.: WO2023/115698

PCT Pub. Date: Jun. 29, 2023

(65) Prior Publication Data

US 2025/0055496 A1 Feb. 13, 2025

(30) Foreign Application Priority Data

Dec. 23, 2021 (CN) .......................... 202111592803.7

(51) Int. Cl.
*H04B 1/38* (2015.01)
*H04B 1/04* (2006.01)
(Continued)

(52) U.S. Cl.
CPC ................. *H04B 1/40* (2013.01); *H04B 1/04* (2013.01); *H04B 1/1036* (2013.01); *H04B 1/16* (2013.01)

(58) Field of Classification Search
CPC ... H04B 1/40; H04B 1/04; H04B 1/16; H04B 1/0007; H04B 1/1036
See application file for complete search history.

(56) References Cited

U.S. PATENT DOCUMENTS 8,594,583 B2 * 11/2013 Montalvo ................ H04B 1/30
                                                                  455/127.5
9,374,053 B2 * 6/2016 Jussila .................... H01C 10/50
(Continued)

FOREIGN PATENT DOCUMENTS

CN          1707961 A      12/2005
CN        102255621 A      11/2011
(Continued)

OTHER PUBLICATIONS

European Patent Office. Extended European Search Report for EP Application No. 22909039.4, mailed Feb. 26, 2025, pp. 1-6.
(Continued)

*Primary Examiner* — Tuan Pham
(74) *Attorney, Agent, or Firm* — Vivacqua Crane, PLLC

(57) ABSTRACT

Disclosed are a signal processing circuit, a chip, a circuit board assembly and a radio-frequency transceiver, where the signal processing circuit may include a resistor array, a mixer, an ADC, a DAC and an amplifier. The resistor array has an output end connected to an input end of the mixer, and the ADC has an output end connected to an input end of the DAC; the resistor array has an input end connected to an input end of the ADC, an RF signal input end is formed at a connection of the input end of the resistor array and the input end of the ADC; the mixer has an output end connected to an output end of the DAC, and a residual signal output end for outputting a residual signal is formed at a connection of the output end of the mixer and the output end of the DAC.

12 Claims, 2 Drawing Sheets

(51) Int. Cl.
    *H04B 1/10*          (2006.01)
    *H04B 1/16*          (2006.01)
    *H04B 1/40*          (2015.01)

(56)           References Cited

U.S. PATENT DOCUMENTS

| | | | |
|---|---|---|---|
| 11,949,386 B2 * | 4/2024 | Pagnanelli | .............. H03F 3/195 |
| 2004/0229580 A1 | 11/2004 | Chen | |
| 2009/0232510 A1 | 9/2009 | Gupta et al. | |
| 2021/0104981 A1 | 4/2021 | Brown, Jr. et al. | |

FOREIGN PATENT DOCUMENTS

| | | | |
|---|---|---|---|
| CN | 108872955 A | 11/2018 | |
| CN | 109995394 A | 7/2019 | |
| CN | 113155306 A | 7/2021 | |
| EP | 2416499 A1 | 2/2012 | |
| WO | 2018175629 A1 | 9/2018 | |

OTHER PUBLICATIONS

International Searching Authority. International Search Report and Written Opinion for PCT Application No. PCT/CN2022/078506 and English translation, mailed Sep. 21, 2022, pp. 1-12.

Wu, H., et al., Three Implementation Schemes of Broadband Integrated RF Front End, Avionics Technology, vol. 51, No. 01, Mar. 2020.

\* cited by examiner

SIGNAL PROCESSING CIRCUIT, CHIP, CIRCUIT BOARD ASSEMBLY AND RADIO-FREQUENCY TRANSCEIVER

CROSS-REFERENCE TO RELATED APPLICATION

This application is a national stage filing under 35 U.S.C. § 371 of international application number PCT/CN2022/078506, filed Feb. 28, 2022, which claims priority to Chinese patent application No. 202111592803.7, filed Dec. 23, 2021. The contents of these applications are incorporated herein by reference in their entirety.

TECHNICAL FIELD

Embodiments of the present disclosure relate to the technical field of analog integrated circuits, in particular to a signal processing circuit, a chip, a circuit board assembly and an RF transceiver.

BACKGROUND

With the development of radio communication systems, the signal bandwidth of analog channels increases significantly. This, in turn, has raised higher performance requirements for radio frequency (RF) transceivers. A zero-intermediate frequency (IF) architecture is commonly used in modern RF transceivers, where an RF signal is converted into an IF analog signal by a mixer at an RF end. The analog signal at an IF end is processed by an IF signal processing circuit and then quantized into a digital signal by an analog-to-digital converter (ADC).

However, in RF transceivers with this traditional architecture, RF and analog signals have to travel through a long path, and considerable amounts of noise and nonlinear elements will be introduced into cascaded circuits, which may lead to overall performance deterioration.

SUMMARY

In an embodiment of the present disclosure provided is a signal processing circuit, including: a resistor array, a mixer, an ADC, a digital-to-analog converter (DAC) and an amplifier. The resistor array has an output end connected to an input end of the mixer, and the ADC has an output end connected to an input end of the DAC. The resistor array has an input end connected to an input end of the ADC, and a radio frequency (RF) signal input end is formed at a connection of the input end of the resistor array and the input end of the ADC. The mixer has an output end connected to an output end of the DAC, and a residual signal output end for outputting a residual signal is formed at a connection of the output end of the mixer and the output end of the DAC. The residual signal output end is connected to an input end of the amplifier. The resistor array and the mixer form a first branch, the ADC and the DAC form a second branch, and the residual signal refers to a difference between intermediate frequency (IF) signals obtained by processing an RF signal through the first branch and the second branch respectively.

In another embodiment of the present disclosure provided is a chip including the signal processing circuit described above.

In yet another embodiment of the present disclosure provided is a circuit board assembly including the signal processing circuit described above.

In yet another embodiment of the present disclosure provided is an RF transceiver including the chip or the circuit board assembly described above.

BRIEF DESCRIPTION OF DRAWINGS

One or more embodiments are exemplarily illustrated with reference to corresponding figures in the accompanying drawings, and these exemplary illustrations do not constitute a limitation to the embodiments. Elements having same reference signs in the accompanying drawings represent similar elements. The figures in the accompanying drawings are not necessarily drawn to scale unless otherwise specified.

DETAILED DESCRIPTION

The embodiments of the present disclosure aim to provide a signal processing circuit, a chip, a circuit board assembly, and an RF transceiver to reduce the path length of RF and analog signals, minimize noise introduction, and improve linearity.

In order to make the purposes, technical schemes and advantages of the embodiments of the present disclosure clearer, the embodiments of the present disclosure will be described in detail with reference to the accompanying drawings. Those having ordinary skill in the art can understand that, in various embodiments of the present disclosure, many technical details have been set forth in order to enable readers to better understand the present disclosure. However, even without these technical details and various changes and modifications based on the following embodiments, the technical schemes of the present disclosure can be implemented. The following embodiments are divided for convenience of description, and should not constitute any limitation on the specific embodiment of the present disclosure. The embodiments can be combined with and referenced by each other with no conflict.

As used herein, the term "comprise/include" refers to the presence of a feature, step or element, but does not exclude the presence or addition of one or more other features, steps or elements. Unless otherwise defined, all the technical and scientific terms used herein have the same meanings as those commonly understood by those skilled in the art to which the present disclosure pertains. The terms used herein are only for the purpose of describing specific embodiments, and are not intended to limit the present disclosure.

Further, in the description of the embodiments of the present disclosure, the terms "first," "second," "third," and the like are used only for descriptive purposes and to distinguish similar objects, and there is no order between them, nor can they be understood as indicating or implying relative importance.

Figure 1:
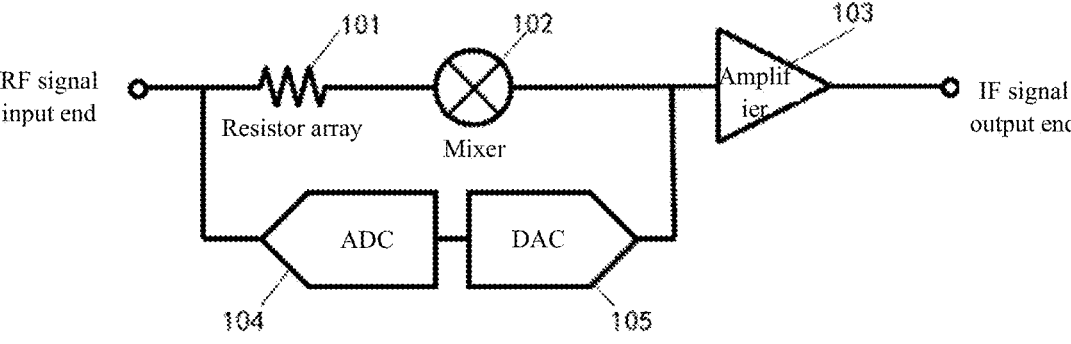
FIG. 1 is a schematic diagram of a signal processing circuit according to an embodiment of the present disclosure.

An embodiment of the present disclosure relates to a signal processing circuit. The schematic diagram of the signal processing circuit is shown in FIG. 1.

In the embodiment, the signal processing circuit includes a resistor array, a mixer, an ADC, a DAC and an amplifier;

an output end of the resistor array is connected to an input end of the mixer, and an output end of the ADC is connected to an input end of the DAC; an input end of the resistor array is connected to an input end of the ADC, forming an radio frequency (RF) signal input end at the connection; and an output end of the mixer and an output end of the DAC are connected, forming a residual signal output end at the connection, and the residual signal output end is connected to an input end of the amplifier. Here, the resistor array and the mixer form a first branch, the ADC and the DAC form a second branch, and the residual signal refers to a difference between intermediate frequency (IF) signals obtained by processing the RF signal through the first branch and the second branch respectively.

Figure 2:
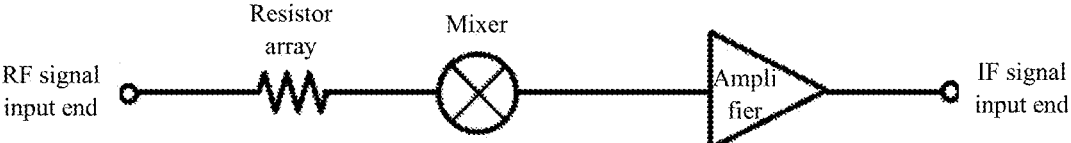
FIG. 2 is a schematic diagram of a conventional zero-IF receiver.

FIG. 2 shows an architecture of a conventional zero-IF receiver, which consists of a resistor array, a mixer and an amplifier which are connected in a cascaded manner. The resistor array, the mixer, the amplifier, an RF signal input end and an IF signal input end are shown in FIG. 2. Here, the mixer converts an RF signal into an IF analog signal at an RF end; and the analog signal at an IF end is processed by an IF signal processing circuit and then quantized into a digital signal by an ADC. In RF transceivers with the architecture shown in FIG. 2, RF and analog signals have to travel through a long path, and considerable amounts of noise and nonlinear elements will be introduced into cascaded circuits, which may lead to overall performance deterioration.

To solve the above problems, the present disclosure proposes a signal processing circuit. Embodiment details of the signal processing circuit in this embodiment will be described in detail below. The following contents are only for the convenience of understanding the embodiment details of this scheme and are not necessary for implementing this scheme. Specifically, as shown in FIG. 1, the signal processing circuit may include the following components: a resistor array 101, a mixer 102, an ADC 104, a DAC 105, and an amplifier 103; an output end of the resistor array 101 is connected to an input end of the mixer 102, and an output end of the ADC 104 is connected to an input end of the DAC 105; an input end of the resistor array 101 is connected to an input end of the ADC 104, forming an RF signal input end at the connection, as shown in FIG. 1; and an output end of the mixer 102 and an output end of the DAC 105 are connected, forming a residual signal output end at the connection, and the residual signal output end is connected to an input end of the amplifier 103. Here, the resistor array 101 and the mixer 102 form a first branch, the ADC 104 and the DAC 105 form a second branch, and the residual signal refers to a difference between IF signals obtained by processing the RF signal through the first branch and the second branch respectively.

Figure 3:
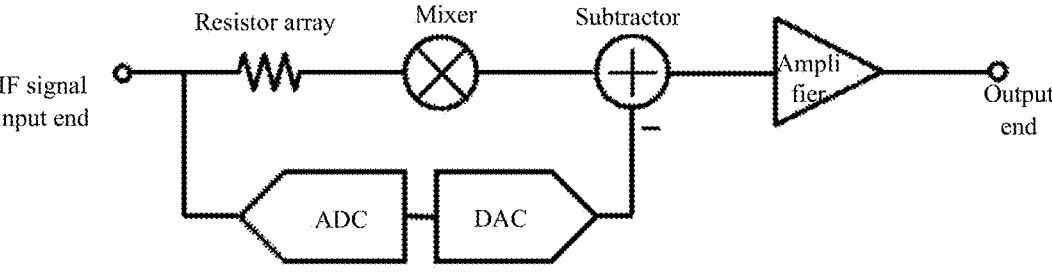
FIG. 3 is a schematic diagram of a signal processing circuit according to another embodiment of the present disclosure.

Here, in practice, the residual signal, i.e., the difference between IF signals obtained by processing the RF signal through the first branch and the second branch respectively, can also be obtained by another approach. That is, a subtractor can be provided at a connection of the output end of the mixer and the output end of the DAC, allowing for the derivation of the residual signal by calculating the difference between the IF signals obtained by processing the RF signal through the first branch and the second branch respectively. FIG. 3 shows a schematic diagram of a signal processing circuit in which a subtractor is provided at the connection between the output end of the mixer and the output end of the DAC.

In addition, in a case where the obtained residual signal is a current signal, it is generally possible to obtain a difference between two branch signals by reversing the connection of differential signals.

In an example, in a case where both the first branch and the second branch are configured as voltage-type output circuits, the signal processing circuit may further include a voltage-current conversion module (not shown in FIG. 1), and the voltage-current conversion module is connected between the residual signal output end and the input end of the amplifier 103. A voltage output from the residual signal output end can be converted into a current signal through the voltage-current conversion module provided in this example.

In another example, the first branch and the second branch are configured in such a way that a signal gain of the first branch is matched with a signal gain of the second branch, and a signal delay of the first branch is matched with a signal delay of the second branch. Gain and delay matching can reduce a peak value of the residual signal, preventing overload of a post-amplifier. In practice, gain and delay matching can be realized by adjusting the impedance of the resistor array or the mixing characteristics of the mixer.

The signal processing circuit in this embodiment can also include an analog-to-digital conversion module which includes an ADC or a plurality of ADCs connected in series. An input end of the analog-to-digital conversion module is connected to an output end of the amplifier, and an output end of the analog-to-digital conversion module is used for outputting the IF signal converted into a digital form. The analog-to-digital conversion module achieves the final conversion of processed signals into a digital form.

The signal processing circuit provided by the embodiment can be applied to devices such as ultra-large bandwidth RF transceivers, ADCs, and active RC filters.

It will be understood by those having ordinary skill in the art that the amplifier in the present disclosure is not limited to the above structure, and any amplifiers with other structures capable of realizing signal amplification and satisfying the requirements of the signal processing circuit in this embodiment are also applicable to this embodiment.

The signal processing circuit provided by this embodiment greatly simplifies the structure of the RF receiver. Compared with the signal processing mode in which an RF signal is first converted to an IF analog signal and then processed by an IF processing circuit, in this embodiment of the present disclosure, the RF signal can be processed entirely through the signal processing circuit. This greatly shortens a processing path for RF and analog signals and minimizes the introduction of noise in the processing path, thereby optimizing the linearity of a transmission link in communication systems.

Another embodiment of the present disclosure relates to a signal processing circuit, which is improved based on the signal processing circuit in the previous embodiment.

With the rapid development of communication technology, the significance of high bandwidth performance in radio communication systems becomes increasingly prominent. In order to broaden the signal bandwidth, a typical architecture of wideband analog signal processing circuits has been introduced. In this architecture, the design of large bandwidth leads to excessively high Q values of filters. In response to the Q value being greater than 0.707, an output characteristic curve will have a peak value, and the peak value increases with the increase of the Q value. The increase of the peak value corresponds to a deterioration in in-band flatness performance. It can be seen that there is a trade-off relationship between signal bandwidth and in-band flatness index. In-band flatness is an amplitude variation of each frequency point of an in-band signal relative to a center frequency, and it is an important indicator for evaluating the linear distortion in a transmission link of communication systems. Therefore, the loss of in-band flatness is unacceptable in many radio communication application scenarios.

Details of the signal processing circuit in this embodiment will be described in detail below. The following contents are only for facilitating the understanding of the details of this scheme and may not be necessary for implementing this scheme.

In this embodiment, the signal processing circuit includes: a resistor array, a mixer, an ADC, a DAC and an amplifier; an output end of the resistor array is connected to an input end of the mixer, and an output end of the ADC is connected to an input end of the DAC; an input end of the resistor array is connected to an input end of the ADC, forming an RF signal input end at the connection; and an output end of the mixer and an output end of the DAC are connected, forming a residual signal output end at the connection, and the residual signal output end is connected to an input end of the amplifier. Here, the resistor array and the mixer form a first branch, the ADC and the DAC form a second branch, and the residual signal refers to a difference between IF signals obtained by processing the RF signal through the first branch and the second branch respectively.

In this embodiment, the signal processing circuit further includes a low-pass filter circuit. The low-pass filter circuit includes a grounding capacitor, a transconductance amplifier, a transimpedance amplifier and a jumper resistor; an input end of the transconductance amplifier is connected to the residual signal output end, an output end of the transconductance amplifier is connected to an input end of the transimpedance amplifier, and an output end of the transimpedance amplifier is used for outputting the IF signal; a first end of the grounding capacitor is connected to the input end of the transconductance amplifier, and a second end of the grounding capacitor is grounded; and a first end of the jumper resistor is connected to the input end of the transconductance amplifier, and a second end of the jumper resistor is connected to the output end of the transimpedance amplifier.

On the basis of a general expression of $$H_{LP} = \frac{G\omega_0{}^2}{S^2 + \left(\dfrac{\omega_0}{Q}\right)S + \omega_0{}^2}$$

a second-order low-pass filter, Kirchhoff's Current Law (KCL) can be used to derive a low-pass filtering form in this structure as follows:

$$H_{(s)} = \frac{-\dfrac{AG_m}{(1+A)C_0C_1}}{S^2 + S\dfrac{R_2C_0 + R_1C_1}{R_1R_2C_0C_1} + \dfrac{1+A+AG_mR_1}{(1+A)R_1R_2C_0C_1}}$$

thereby determining a bandwidth of the circuit as follows:

$$\omega_0^2 = \frac{1+A+AG_mR_1}{1+A} \cdot \frac{1}{R_1R_2C_0C_1}$$

From the above expression, it can be known that the bandwidth of the low-pass filter circuit provided in this embodiment can be significantly increased.

A feedback resistor (R1) can be further added to the low-pass filter circuit. A first end of the feedback resistor is connected to the input end of the transimpedance amplifier, and a second end of the feedback resistor is connected to the output end of the transimpedance amplifier. Adding the feedback resistor in the low-pass filter circuit can also broaden the bandwidth.

The low-pass filter circuit may also include a feedback capacitor, and the feedback capacitor is connected in parallel with the jumper resistor.

Figure 4:
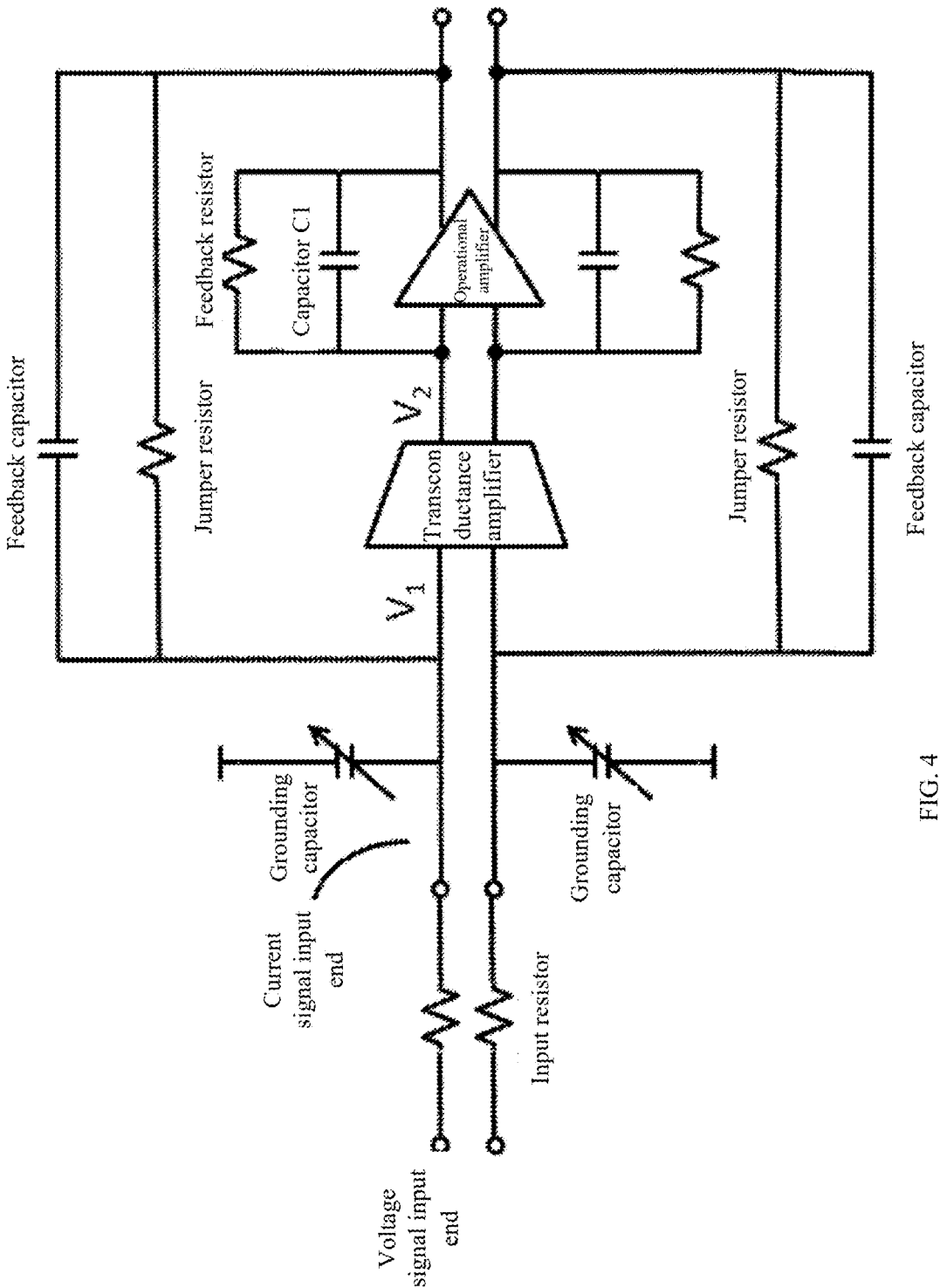
FIG. 4 is a schematic diagram of a low-pass filter circuit according to an embodiment of the present disclosure.

In a case where both the first branch and the second branch are configured as voltage-type output circuits, the low-pass filter circuit may further include an input resistor, and the input end of the transconductance amplifier is connected to the residual signal output end through the input resistor. The schematic diagram of the low-pass filter circuit mentioned in this example is shown in FIG. 4. A transconductance amplifier (−Gm) with an amplification factor of −Gm, an operational amplifier (−A) with an amplification factor of −A, a grounding capacitor (C0), and a jumper resistor (R2) are shown in FIG. 4. An input end of the transconductance amplifier −Gm is connected to the residual signal output end, an output end of the transconductance amplifier −Gm is connected to an input end of the operational amplifier −A, and an output end of the operational amplifier −A is used for outputting a processed IF signal; a first end of the grounding capacitor C0 is connected to the input end of the transconductance amplifier −Gm, and a second end of the grounding capacitor C0 is grounded; and a first end of the jumper resistor is connected to the input end of the transconductance amplifier −Gm, and a second end of the jumper resistor R2 is connected to the output end of the operational amplifier −A.

The feedback capacitor (C2) in the low-pass filter circuit is shown in FIG. 4. In a low-pass filter circuit without this feedback capacitor, an expression of the Q value is:

$$Q \approx \frac{\sqrt{1 + G_mR_1}}{\sqrt{\dfrac{R_2C_0}{R_1C_1}} + \sqrt{\dfrac{R_1C_1}{R_2C_0}}}$$

The Q value is an index that can reflect the in-band flatness. From the above expression, it can be seen that a large bandwidth results in a large Q value, that is, the larger the bandwidth, the worse the in-band flatness. To solve this problem, the feedback capacitor C2 as shown in FIG. 4 can be added to the low-pass filter circuit. In the low-pass filter circuit with the feedback capacitor C2, by applying the KCL formula and normalizing the equation, the expression of the Q value can be derived as follows:

$$Q \approx \frac{\sqrt{1 + G_mR_1}}{(1 + G_mR_1)\sqrt{\dfrac{R_2C_2}{R_1C_1}} + \sqrt{\dfrac{R_1C_1}{R_2C_2}}}$$

By introducing a factor (1+GmR1) in the denominator of the expression of the Q value mentioned above, it is possible to reduce the Q value while keeping the bandwidth unchanged. That is to say, the in-band flatness can be significantly improved while ensuring a high bandwidth.

Adding the feedback capacitor in the low-pass filter circuit allows for the decoupling of bandwidth and flatness, ensuring a desired bandwidth without compromising the flatness.

The input resistor in the low-pass filter circuit is shown in the figure. Adding the input resistor as shown in FIG. 4 to the low-pass filter circuit enables a voltage signal input into the low-pass filter circuit to be converted into a current in a case where both the first branch and the second branch are configured as voltage-type output circuits.

In this embodiment, in addition to adding the input resistor to the low-pass filter circuit for converting a voltage signal outputted from the residual signal output end into a current signal, the signal processing circuit provided by this embodiment may also include a voltage-current conversion module (not shown in FIG. 1) in a case where both the first branch and the second branch are configured as voltage-type output circuits, and the voltage-current conversion module is connected between the residual signal output end and the input end of the amplifier. The voltage-current conversion module can also be used to convert the voltage signal output from the residual signal output end into the current signal.

In actual use of the signal processing circuit provided by this embodiment, in order to achieve a desired bandwidth and a satisfactory in-band flatness, values of the resistors and capacitors involved in the circuit structure of the signal processing circuit can be determined by the following steps. Firstly, the value of the jumper resistor can be determined by considering the equivalent input impedance of the previous stage and the gain distribution of the whole link; secondly, according to a required bandwidth index, a product of the values of the feedback resistor, the jumper resistor, the grounding capacitor and a shunt capacitor is determined; after a flatness index is converted to a Q value, the value of the feedback resistor can be obtained; and the values of the grounding capacitor and the shunt capacitor can be adjusted according to the loop stability, noise, linearity and other indicators of application scenarios.

In this embodiment, the signal processing circuit greatly simplifies the structure of the RF receiver. Compared with the signal processing mode in which an RF signal is first converted to an IF analog signal and then processed by an IF processing circuit, in this embodiment of the present disclosure, the RF signal can be processed entirely through the signal processing circuit. This greatly shortens a processing path for RF and analog signals and minimizes the introduction of noise in the processing path, thereby optimizing the linearity of a transmission link in communication systems. In addition, by adding the low-pass filter circuit to the signal processing circuit in this embodiment, the bandwidth can be greatly expanded due to the effects of amplifier gain and transconductance. Adding the feedback capacitor in the low-pass filter circuit allows for the decoupling of bandwidth and flatness, ensuring a desired bandwidth without compromising the flatness. Compared with the traditional architecture, the in-band flatness can be significantly improved.

It is worth mentioning that the above embodiment of the present disclosure has not introduced elements that are not closely related to the resolution of the technical problems raised in the present disclosure, but this does not mean that there are no other elements in this embodiment.

An embodiment of the present disclosure relates to a chip including the signal processing circuit. The signal processing circuit in the chip provided by this embodiment greatly simplifies the structure of the RF receiver. Compared with the signal processing mode in which an RF signal is first converted to an IF analog signal and then processed by an IF processing circuit, in this embodiment of the present disclosure, the RF signal can be processed entirely through the signal processing circuit in the chip. This greatly shortens a processing path for RF and analog signals and minimizes the introduction of noise in the processing path, thereby optimizing the linearity of a transmission link in communication systems.

Another embodiment of the present disclosure relates to a circuit board assembly including the signal processing circuit. With the signal processing circuit in the circuit board assembly provided by this embodiment, the structure of the RF receiver is greatly simplified. Compared with the signal processing mode in which an RF signal is first converted to an IF analog signal and then processed by an IF processing circuit, in this embodiment of the present disclosure, the RF signal can be processed entirely through the signal processing circuit in the circuit board assembly. This greatly shortens a processing path for RF and analog signals and minimizes the introduction of noise in the processing path, thereby optimizing the linearity of a transmission link in communication systems.

Another embodiment of the present disclosure relates to an RF transceiver including the chip or circuit board assembly. The RF transceiver provided by this embodiment simplifies the architecture compared to traditional RF transceivers. Compared with the signal processing mode in which an RF signal is first converted to an IF analog signal and then processed by an IF processing circuit, in this embodiment of the present disclosure, the RF signal can be processed entirely through the signal processing circuit in the RF transceiver. This greatly shortens a processing path for RF and analog signals and minimizes the introduction of noise in the processing path, thereby optimizing the linearity of a transmission link in communication systems.

The above-mentioned embodiments are provided to those having ordinary skill in the art to realize and use the present disclosure, and those having ordinary skill in the art can make various modifications or changes to the above-mentioned embodiments without departing from the application idea of the present disclosure, so the scope of protection of the present disclosure is not limited by the above-mentioned embodiments, but should conform to the maximum scope of innovative features mentioned in the claims.

What is claimed is:

1. A signal processing circuit, comprising a resistor array, a mixer, an analog-to-digital converter (ADC), a digital-to-analog converter (DAC) and an amplifier, wherein:

the resistor array has an output end connected to an input end of the mixer, and the ADC has an output end connected to an input end of the DAC;

the resistor array has an input end connected to an input end of the ADC, a radio frequency (RF) signal input end is formed at a connection of the input end of the resistor array and the input end of the ADC;

the mixer has an output end connected to an output end of the DAC, and a residual signal output end for outputting a residual signal is formed at a connection of the output end of the mixer and the output end of the DAC, wherein the residual signal output end is connected to an input end of the amplifier; and the resistor array and the mixer form a first branch, the ADC and the DAC form a second branch, and the residual signal refers to a difference between intermediate frequency (IF) signals obtained by processing an RF signal through the first branch and the second branch respectively.

2. The signal processing circuit of claim 1, further comprising a low-pass filter circuit comprising:

a grounding capacitor, a transconductance amplifier, a transimpedance amplifier and a jumper resistor; wherein:

the transconductance amplifier has an input end connected to the residual signal output end, and an output end connected to an input end of the transimpedance amplifier, and the transimpedance amplifier has an output end for outputting an IF signal; and the grounding capacitor has a first end connected to the input end of the transconductance amplifier, and a second end grounded; and the jumper resistor has a first end connected to the input end of the transconductance amplifier, and a second end connected to the output end of the transimpedance amplifier.

3. The signal processing circuit of claim 2, further comprising a feedback capacitor connected in parallel with the jumper resistor.

4. The signal processing circuit of claim 2, wherein in a case where each of the first branch and the second branch is configured as a voltage-type output circuit, the low-pass filter circuit further comprises an input resistor, and the input end of the transconductance amplifier is connected to the residual signal output end through the input resistor.

5. The signal processing circuit of claim 1, wherein in a case where each of the first branch and the second branch is configured as a voltage-type output circuit, the signal processing circuit further comprises a voltage-current conversion module connected between the residual signal output end and the input end of the amplifier.

6. The signal processing circuit of claim 1, wherein the first branch and the second branch are configured in such a way that the first branch has a signal gain matched with a signal gain of the second branch, and the first branch has a signal delay matched with a signal delay of the second branch.

7. The signal processing circuit of claim 1, further comprising an analog-to-digital conversion module comprising an ADC or a plurality of ADCs connected in series; and wherein:

the analog-to-digital conversion module has an input end connected to an output end of the amplifier, and an output end for outputting an IF signal converted into a digital form.

8. A chip comprising a signal processing circuit, the signal processing circuit comprising a resistor array, a mixer, an analog-to-digital converter (ADC), a digital-to-analog converter (DAC) and an amplifier, wherein:

the resistor array has an output end connected to an input end of the mixer, and the ADC has an output end connected to an input end of the DAC;

the resistor array has an input end connected to an input end of the ADC, a radio frequency (RF) signal input end is formed at a connection of the input end of the resistor array and the input end of the ADC; the mixer has an output end connected to an output end of the DAC, and a residual signal output end for outputting a residual signal is formed at a connection of the output end of the mixer and the output end of the DAC, wherein the residual signal output end is connected to an input end of the amplifier; and the resistor array and the mixer form a first branch, the ADC and the DAC form a second branch, and the residual signal refers to a difference between intermediate frequency (IF) signals obtained by processing an RF signal through the first branch and the second branch respectively.

9. A circuit board assembly comprising the signal processing circuit of claim 1.

10. A radio frequency (RF) transceiver comprising a signal processing circuit, the signal processing circuit comprising a resistor array, a mixer, an analog-to-digital converter (ADC), a digital-to-analog converter (DAC) and an amplifier, wherein:

the resistor array has an output end connected to an input end of the mixer, and the ADC has an output end connected to an input end of the DAC;

the resistor array has an input end connected to an input end of the ADC, a radio frequency (RF) signal input end is formed at a connection of the input end of the resistor array and the input end of the ADC;

the mixer has an output end connected to an output end of the DAC, and a residual signal output end for outputting a residual signal is formed at a connection of the output end of the mixer and the output end of the DAC, wherein the residual signal output end is connected to an input end of the amplifier; and the resistor array and the mixer form a first branch, the ADC and the DAC form a second branch, and the residual signal refers to a difference between intermediate frequency (IF) signals obtained by processing an RF signal through the first branch and the second branch respectively.

11. The signal processing circuit of claim 3, wherein in a case where each of the first branch and the second branch is configured as a voltage-type output circuit, the low-pass filter circuit further comprises an input resistor, and the input end of the transconductance amplifier is connected to the residual signal output end through the input resistor.

12. The signal processing circuit of claim 1, further comprising a subtractor provided at a connection of the output end of the mixer and the output end of the DAC.

* * * * *